US012659394B2

(12) United States Patent　　　　　(10) Patent No.:　US 12,659,394 B2
McCoy　　　　　　　　　　　　　　　　(45) Date of Patent:　Jun. 16, 2026

(54) FOLDABLE CLIP-ON PHONE TRIPOD

(71) Applicant: Jeremiah Benjamin Bowe McCoy, Bellingham, WA (US)

(72) Inventor: Jeremiah Benjamin Bowe McCoy, Bellingham, WA (US)

( * ) Notice: Subject to any disclaimer, the term of this patent is extended or adjusted under 35 U.S.C. 154(b) by 526 days.

(21) Appl. No.: 17/283,953

(22) PCT Filed: Oct. 8, 2019

(86) PCT No.: PCT/US2019/055274
　　§ 371 (c)(1),
　　(2) Date: Apr. 8, 2021

(87) PCT Pub. No.: WO2020/076878
　　PCT Pub. Date: Apr. 16, 2020

(65) Prior Publication Data
　　US 2021/0337057 A1　　Oct. 28, 2021

Related U.S. Application Data

(60) Provisional application No. 62/742,711, filed on Oct. 8, 2018.

(51) Int. Cl.
　　*H04M 1/18*　　　(2006.01)
　　*F16M 11/12*　　(2006.01)
　　*H04B 1/3877*　　(2015.01)
　　*H04B 1/3888*　　(2015.01)
　　*H04M 1/04*　　　(2006.01)

(52) U.S. Cl.
　　CPC ............. *H04M 1/04* (2013.01); *F16M 11/12* (2013.01); *H04B 1/3877* (2013.01); *H04B 1/3888* (2013.01)

(58) Field of Classification Search
　　CPC ..... H04M 1/04; F16M 11/041; F16M 11/043; F16M 11/12; F16M 11/2021; F16M 11/38; F16M 13/02; G03B 17/561; H04B 1/3877; H04B 1/3888
　　USPC ...................................... 455/575.1
　　See application file for complete search history.

(56) References Cited

U.S. PATENT DOCUMENTS

2014/0097306 A1* 4/2014 Hale ...................... H04M 1/04
　　　　　　　　　　　　　　　　　　　248/274.1

OTHER PUBLICATIONS

IP.com search history (Year: 2025).*

* cited by examiner

*Primary Examiner* — Moustapha Diaby
(74) *Attorney, Agent, or Firm* — FisherBroyles, LLP; Susan M. Oiler

(57)　　　　ABSTRACT

A clip-on support device is provided, for supporting a personal cell phone for use as a camera or viewing hands free. The device includes a clip-on attachment and a stand, and is capable of folding up conveniently onto the back of the cell phone for easy use, eliminating the need to carry the stand as a separate attachment.

8 Claims, 10 Drawing Sheets

FOLDABLE CLIP-ON PHONE TRIPOD

BACKGROUND

Field of the Invention

This invention is in the field of personal cell phone accessories. Specifically, the invention relates to the use of the cell phone camera, which is common in most modern commercial cell phone designs, and a support mechanism so that the camera can be used by placing it on a surface rather than holding the phone by hand.

Related Art

Personal cell phones, or "smart phones," are very common consumer electronics items, and capturing pictures and video are some of the most common uses.

While such devices are very convenient for the capture of hand-held images, in some cases, it is advantageous or necessary to provide a more stable support during operation. Several products exist on the market to support a phone on a stable substrate, in order to take pictures or video, which are designed to be carried separately from the cell phone and attached when needed. Other devices, such as attachable sockets, are designed to stand on a flat surface and to hold a phone at a fixed angle.

SUMMARY OF THE INVENTION

The invention addresses the problems cited above, and provides a portable folding stand that can be attached or detached from a personal cell phone. When folded it is compact in nature and easy to carry, and when it is unfolded it can support a cell phone on a surface for taking pictures or videos, or viewing the screen, at a wide and continuous range of different angles and orientations.

The tripod includes set of legs which are foldable into multiple configurations. Attached to the legs is a rotatable arm with a pivoting joint connecting it to the upper stand leg. The rotatable arm is also connected by another rotatable joint to a clip-on attachment which can hold a cell phone in a set of clamping brackets, and the arm is segmented with each of the segments being able to rotate relative to each other.

In one configuration the legs are able to lay folded together in a single plane, with the rotatable arm and clip-on attachment also folding up into a compact arrangement where they are nestled against one another, reducing the space needed for carrying it when it is not deployed. In another configuration the arm can be rotated to provide a support pillar for the clip-on attachment, while the legs may be rotated to be oriented perpendicular or at angles to one another to provide a tripod-like structure that can support the cell phone at various angles and in different orientations. The rotatable joint connecting the upper stand leg and the stand arm, the rotation of the segments of the stand arm, and the rotation of the clip-on attachment relative to the stand arm define three degrees of orthogonal rotation, allowing the cell phone to be oriented in any angle desired with precise control.

In addition to being a support structure for a cell phone, embodiments of the invention may also allow the user to attach the invention to a set of keys, making it highly portable, and convenient to carry, and in some embodiments it may include a money clip for carrying paper cash or a credit card and attaching it to the personal cell phone, giving the invention greater versatility than being solely a device to support and position a phone.

In a broad aspect, the tripod comprises a first stand leg having first and second ends; a second stand leg having first and second ends, coupled at the first end to the first end of the first stand leg and configured to rotate relative to the first stand leg about a first axis of rotation, the first and second stand legs being configured to rotate into a stowed configuration in which the first and second stand legs lie in a same layer of components; and a stand arm having first and second ends, coupled at the first end to the first stand leg at a point proximate the first end of the first stand leg and configured to rotate relative to the first stand leg about a second axis of rotation perpendicular to the first axis of rotation, and to rotate into stowed configuration in which the stand arm lies in a second layer of components.

The tripod may further comprise a clip-on attachment coupled to the second end of the stand arm and rotatable relative to the stand arm about a third axis of rotation, the third axis of rotation lying perpendicular to a longitudinal axis of the stand arm, the clip-on attachment having a pair of gripping jaws configured to grip and hold a cell phone in a user-selected orientation.

Contact points at the second end of the first stand leg and at the first and second ends of the second stand leg may lie in a common plane, the first axis lying normal to the common plane; and while the first and second stand legs are in the stowed configuration the first, second, and third contact points may lie on a common line.

The tripod may further comprise a third stand leg having first and second legs, coupled at the first end to the first end of the first stand leg and configured to rotate relative to the first stand leg about the first axis of rotation, about which the first end of the second stand leg also rotates relative to the first stand leg.

The stand arm of the tripod may include first and second segments configured to rotate relative to each other about a third axis, perpendicular to the second axis, the first segment being coupled to the first stand leg. The tripod may further comprise a cell phone holding element coupled to the second segment of the stand arm and is configured to rotate relative to the third axis, about a fourth axis perpendicular to the third axis.

The cell phone holding element may be configured to engage a cell phone between spring-driven jaws and hold the cell phone in a user-selected orientation. The cell phone holding element may be configured to engage a case mounted to the cell phone.

These and other features and advantages of the present invention will be more fully understood from reading of the following detailed description with reference to the accompanying drawings.

DETAILED DESCRIPTION

Figure 1:
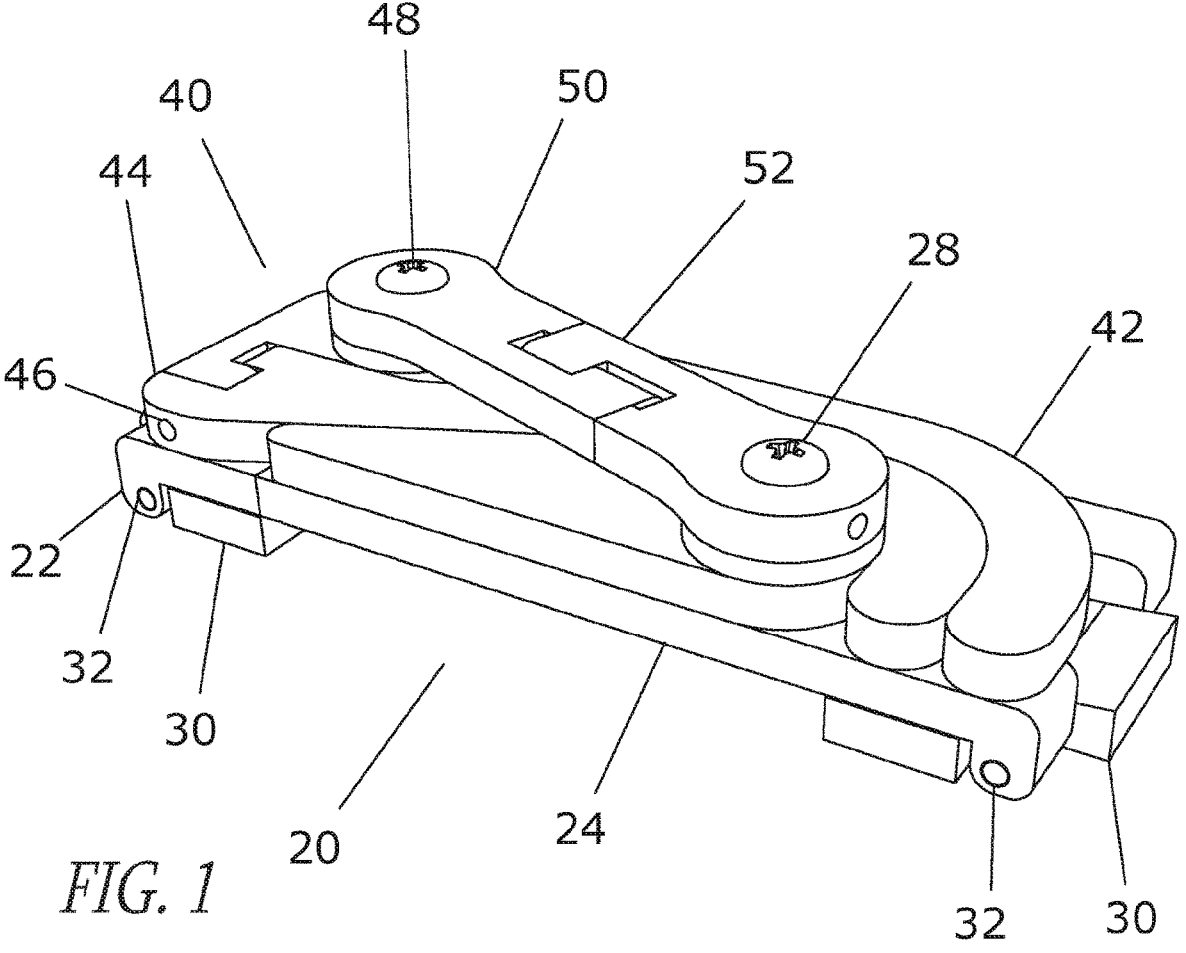
FIG. 1 is a perspective drawing of a foldable clip-on phone tripod, in the fully folded configuration, according to an embodiment, attached to a cell phone.

It will be understood that the scope of the appended claims should not be limited by particular embodiments set forth herein, but should be construed in a manner consistent with the specification as a whole.

One aspect of most cell phones that can be disadvantageous when using a personal cell phone as a camera is that cell phones are generally very thin relative to their width and height, and designed to fit in the user's pocket or hand. It can be difficult to balance a cell phone on its edge in order to capture a picture or video, rather than being held in the user's hand. This is a common frustration among cell phone users attempting to take pictures or video without holding the phone in their hands.

Although products exist on the market to support a phone in order to take pictures or video, they are typically relatively large compared to the dimensions of the cell phones they support and must be carried separately from the cell phone and attached when needed. Other available devices, though smaller, do not allow continuous adjustment to the orientation or angle of the cell phone relative to the underlying surface, making them unfit for uses that require a fine degree of control over the angle of the cell phone camera.

The inventor has recognized a need for a simple folding mechanism to create a support device that can be easily and conveniently attached to a cell phone so that the advantages of having a support for the cell phone can be enjoyed as needed without a bulky separate device. This device would allow the user to capture pictures or video in nearly any environment as well as allowing the user to view the screen of the cell phone at an adjustable angle and orientation, as long as a suitable surface is available, without the need to hold the phone in the hand.

Furthermore, the small size of the present invention allows the device, in an embodiment, to be attached to a keychain or carried in a pocket and easily brought along with the user anywhere that they may wish to have the device available for use. A further embodiment employs a clip that can be used to carry money or cards such as credit cards attached to the phone with the device clipped on, thereby adding an extra benefit of keeping the users phone, money and credit cards, and keys attached to each other in whichever combination the user prefers.

FIGS. 1-4 show a cell phone assembly, according to an embodiment, that includes a collapsible two-legged folding stand (40) unit configured to be clipped onto the back of a personal cell phone or phone case (10) via a clip-on attachment (20), for easy portability and convenient use whenever needed. The folding stand (40) in this embodiment includes a pair of folding legs, i.e., an upper stand leg (42) and a lower stand leg (44), which are connected by a stand leg hinge pin (46). The upper stand leg (42) is also connected to a segmented stand arm (50, 52) which connects the folding stand (40) to the clip-on attachment (20).

Referring to the embodiment shown in FIG. 1, when the folding stand (40) is in the folded configuration, the upper stand leg (42) and the lower stand leg (44) are nested, so as to lay flat against the back of the clip-on attachment (20). Additionally, the lower stand arm segment (50) and the upper stand arm segment (52) lie flat across the upper and lower stand legs (42, 44), the lower stand arm segment (50) being attached at one end to the upper stand leg (42) by a stand arm screw (48), and the upper stand arm segment (52) attached at the opposite end to the clip-on attachment (20) by the clip-on attachment screw (28). An advantage of this folded configuration is that the total thickness of the folding stand (40) is simply the combined thickness of the upper stand leg (42) and the stand arm (50). All of the components lie flat against each other, making the profile of the folding stand slim and convenient.

In the embodiment shown in FIG. 1, it can be seen that one end of the upper stand leg (42) and both ends of the lower stand leg (44) are aligned, so that a contact point on the end of the upper stand leg, and contact points on both ends of the lower stand leg define a common line. Additionally, the axis of rotation defined by the stand leg hinge pin (46) lies perpendicular to the common line defined by the contact points of the upper and lower stand legs (42, 44). Accordingly, when the upper and lower stand legs (42, 44) are rotated away from the position shown in FIG. 1 (as described below with reference to FIGS. 2 and 3), the contact points define a plane, with the stand leg hinge pin (46)—and the corresponding axis of rotation—lying normal thereto. Changes in the angle of the upper and lower stand legs (42, 44), relative to each other, do not affect the angle of the stand leg hinge pin (46) relative to the defined plane. Furthermore, as may become more clear in view of the discussion that follows, adjustments to the angle of the upper and lower stand legs (42, 44), relative to each other will not affect the orientation of the cell phone (10) relative to the plane defined by the three contact points.

Figure 2:
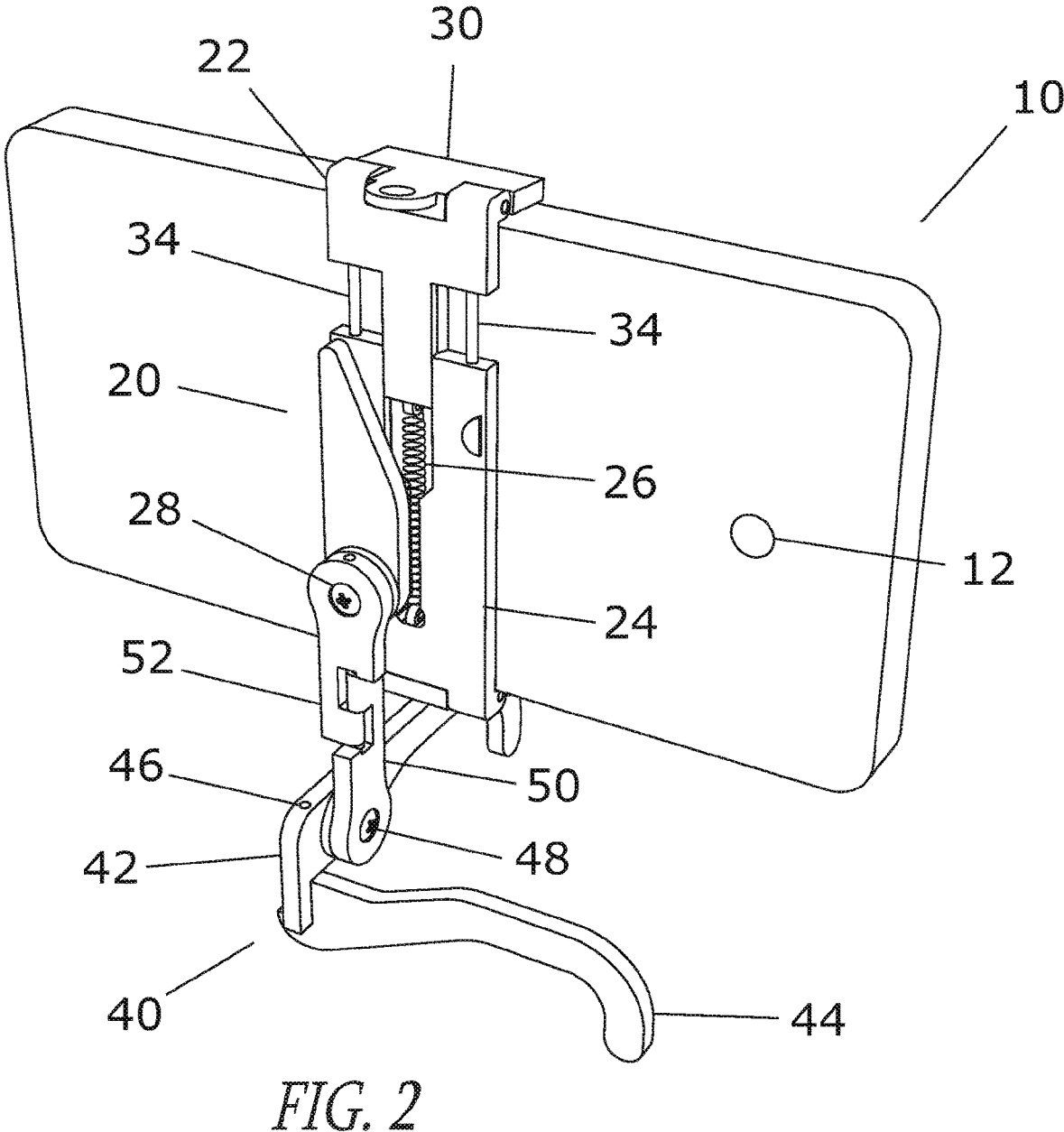
FIG. 2 is a perspective drawing of the foldable clip-on phone tripod of FIG. 1, unfolded and supporting the phone in a landscape orientation.

Referring to the view of FIG. 2 the folding stand (40) is shown in the unfolded configuration, holding the cell phone (10) in a horizontal or "landscape" orientation, with the cell phone camera (12) facing forward. In this configuration, the folding stand (40) is shown with the upper stand leg (44) rotated at a right angle relative to the lower stand leg (42), with both ends of the lower stand leg (44) in contact with the underlying surface, and the stand leg hinge pin (46) positioned at the apex of a triangular support structure. Both the upper stand leg (42) and the lower stand leg (44), in this embodiment, have an arcuate shape, a radius on the lower edge of the upper stand leg (42) substantially matching a radius on the upper edge of the lower stand leg (44), to permit them to lie nested together while in the folded configuration, as shown in FIG. 1. Additionally, a radius on the lower edge of the lower stand leg (44) provides clearance for the stand arm hinge (52) to lie in the same plane. The arcuate shapes of the upper and lower stand arms (42, 44) also provide ground clearance between the three contact points of the folding stand (40) to support the phone on uneven surfaces.

Referring again to the view of FIG. 2, in one embodiment, the lower stand arm segment (50) is rotatable, relative to the upper stand arm screw (42) around a stand arm screw (28), from the folded configuration shown in FIG. 1 into a vertical configuration, as shown in FIG. 2. In this configuration, the clip-on attachment (20) can also be rotated around the clip-on attachment screw (28) relative to the upper stand arm segment (52), so that the clip-on attachment (20) is in a vertical orientation, capable of holding the cell phone (10) in the horizontal or "landscape" orientation for the cell phone camera (12). The clip-on attachment (20) can also be rotated by the relative axial rotation of the lower stand arm segment (50) and the upper stand arm segment (52) around the stand arm hinge pin (54), to allow the upper stand leg (42) to be positioned perpendicularly to the face of the cell phone camera (12).

Referring again to the view of FIG. 2, in one embodiment, the angle between the lower stand arm segment (50) and the upper stand leg (42) can be adjusted by pivoting around the stand arm screw (28), allowing the angle between the supporting surface and the stand arm (50) to be changed to adjust the angle of the cell phone camera (12) to point upwards or downwards relative to the supporting surface. The angle between the lower stand arm segment (50) and the upper stand arm segment (52) can be adjusted by rotation around the stand arm hinge pin (54). The angle between the upper stand arm segment (52) and the clip-on attachment (20) can also be adjusted by pivoting around the clip-on attachment screw (28) to adjust the tilt of the cell phone camera (12), clockwise or counter-clockwise relative to the ground plane. In other words, according to an embodiment, the stand arm screw (28), the stand arm hinge (52), and the clip-on attachment screw (28) each define respective axes of rotation that lie perpendicular to each other when in the unfolded configuration, which allow the precise positioning of the angle of the cell phone camera (12) in three different axes.

Figure 3:
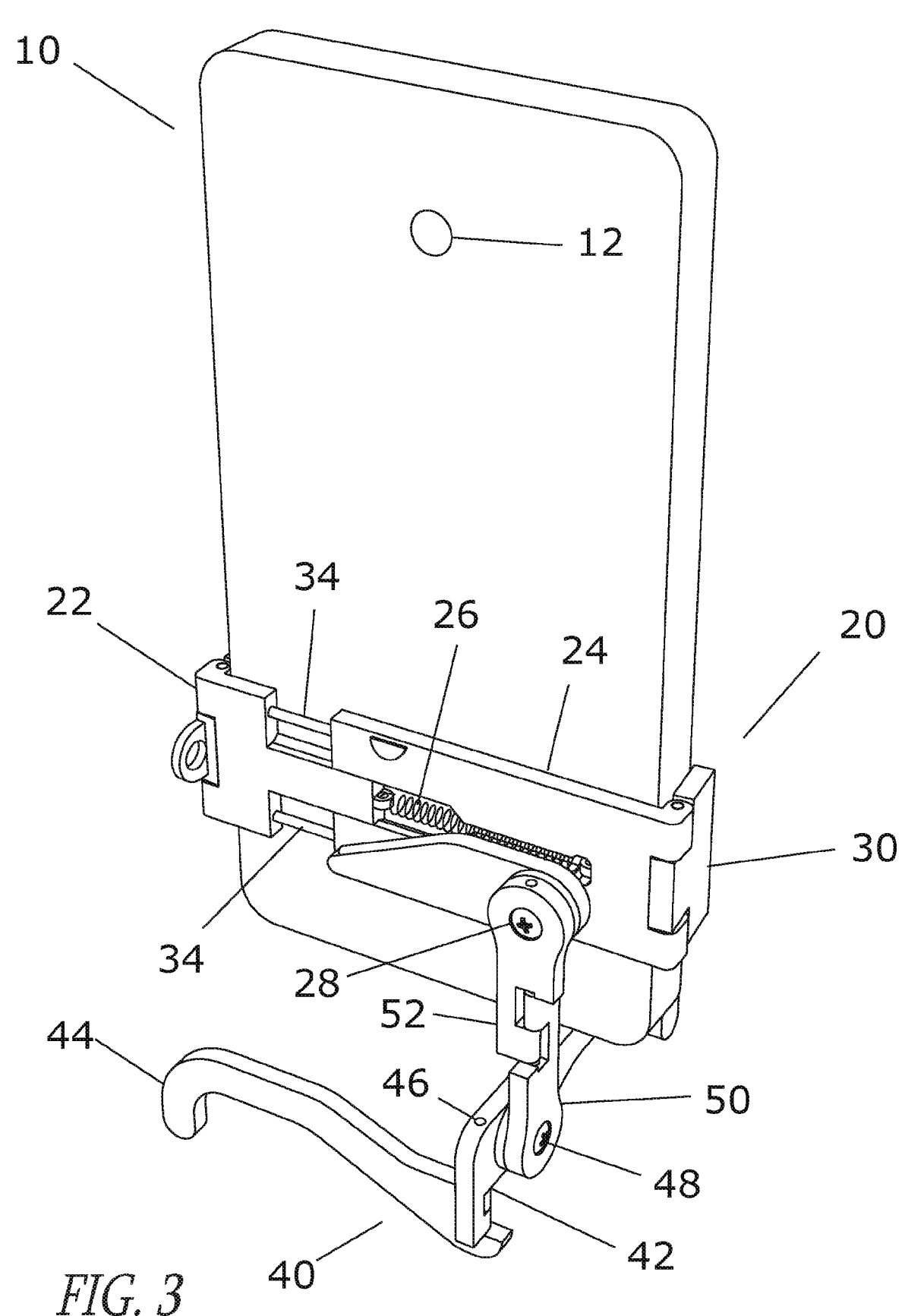
FIG. 3 is a perspective drawing of the foldable clip-on phone tripod of FIG. 1, unfolded and supporting the phone in a portrait orientation.

Referring now to the view of FIG. 3, in one embodiment the upper stand leg (44) is again rotatable relative to the lower stand leg (46) and clip-on attachment (20) forming a triangular support structure, while the lower stand arm segment (50) is rotated relative to the upper stand leg (46) into a vertical configuration. The clip-on attachment (20) is, in this view, rotated around the clip-on attachment screw (28) into a horizontal orientation, capable of holding the cell phone (10) in the vertical or "portrait" orientation for the cell phone camera (12). As in the horizontal configuration of FIG. 2, the clip-on attachment (20) can also be rotated by the upper and lower stand arm segments (52, 50) around the stand arm hinge pin (54), to allow the upper stand leg (42)(42) to be positioned perpendicularly to the face of the cell phone camera (12). Again as in FIG. 2, the angle between the upper and lower stand arm segments (52, 50) and the upper stand leg (42)(42) can be adjusted by pivoting around the stand arm screw (28), allowing the angle between the supporting surface and the stand arm (50) to be changed to adjust the angle of the cell phone camera (12) to point upwards or downwards relative to the supporting surface, and the angle between the stand arm (50) and the clip-on attachment (20) can also be adjusted by pivoting around the clip-on attachment screw (28) to adjust the tilt of the cell phone camera (12), clockwise or counter-clockwise relative to the ground plane.

In FIGS. 2 and 3, the lower stand leg (44) is shown at a right angle, relative to the upper stand leg (42), with the lower stand leg extending under the clip-on attachment (20). However, it should be noted that the relative angle of the upper and lower stand legs (42, 44) is not limited to the angle shown, but can be set at any desired angle, with the lower stand leg (44) extending either under the clip-on attachment (20) or away from the clip-on attachment. This enables a user to adjust the folding stand (40) so as to accommodate variations in support surfaces and to support the cell phone (10) in any desired position.

Figure 4:
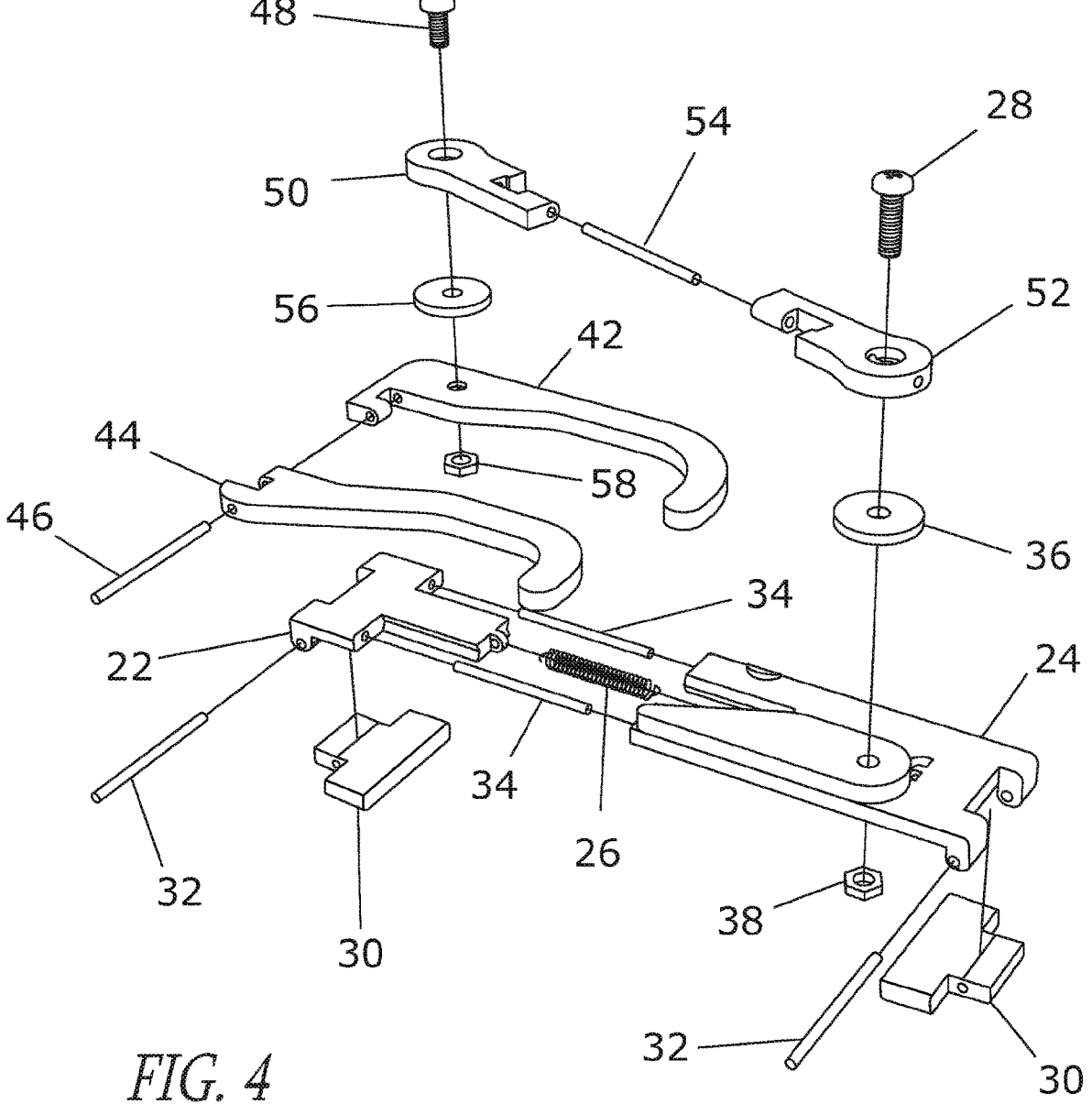
FIG. 4 is an exploded view of the foldable clip-on phone tripod of FIG. 1, showing individual parts and how they are to be assembled together, according to an embodiment.

Referring to the view of FIG. 4, assembly of the folding stand (40), according to one embodiment is accomplished by provision of the stand leg hinge pin (46), the stand arm screw (48), the stand arm hinge pin (54), the clip-on attachment screw (28), and a clip-on attachment spring (26). In one embodiment, the upper stand leg (42) and the lower stand leg (44) are joined together at one end by the stand leg hinge pin (46) which is inserted into hollow cylindrical holes in each of the stand legs, a portion of the stand leg hinge pin (46) being held within the space of the upper stand leg (42) and another portion being held within the lower stand leg (44) thereby joining them together. The lower stand arm segment (50) is attached to the upper stand leg (44) by the stand arm screw (48). The tightness of the stand arm screw (48) can be used to set the frictional force resisting the rotation of the lower stand arm segment (50), and in one embodiment can be glued or otherwise affixed to the stand arm (50) at a specific angle so that rotation of the lower stand arm segment (50) relative to the upper stand leg (42) does not cause a loosening of the stand arm screw (48). In one embodiment, the stand arm screw (48) is used in combination with a stand arm washer (56) and a stand arm nut (58) to fasten the stand arm (50) to the upper stand leg (44). Additionally, or alternatively, other fastening elements can be employed as appropriate, including washers, lock washers, bushings, nuts, rivets, etc.

Referring again to the view of FIG. 4, in one embodiment the lower stand arm segment (50) and the upper stand arm segment (52) are joined together by the stand arm hinge pin (54) which is inserted into a hollow cylindrical space at one end of the upper stand arm segment (52) and into the open cylindrical space shared with the lower stand arm segment (52) thereby joining the two stand arm segments (50, 52) together. The upper stand arm segment (52) is fastened to the clip-on attachment stationary bracket (24), of the clip-on attachment (20) by the clip-on attachment screw (28). The tightness of the clip-on attachment screw (28) can be used to set the frictional force resisting the rotation of the clip-on attachment (20) relative to the upper stand arm segment (52), and in one embodiment can be glued or otherwise affixed to the upper stand arm segment (52) at a specific angle so that rotation of the upper stand arm segment (52) relative to clip-on attachment (20) does not cause a loosening of the clip-on attachment screw (28). In one embodiment, the clip-on attachment screw (28) is used in combination with a clip-on attachment washer (36) and a clip-on attachment nut (38) to fasten the stand arm (50) to the clip-on attachment (20). Additionally, or alternatively, other fastening elements can be employed as appropriate, including washers, lock washers, bushings, nuts, rivets, etc.

In the embodiment shown in FIGS. 1 to 4, the clip-on attachment (20) comprises a pair of brackets, i.e., a stationary bracket (24) which, as described above, is connected to the upper stand arm segment (52) and a sliding bracket (22) which in this embodiment allows for lateral motion between the stationary bracket (24) and the sliding bracket (22) in order to allow the distance between the brackets to be variable. In one embodiment, the sliding bracket (22) and the stationary bracket (24) are connected by the clip spring (26), which provides tension between the two brackets, and a pair of sliding pins (34). The sliding pins (34) connect the sliding bracket (22) to the stationary bracket (24), being fixed to the sliding bracket (22) and moveable inside corresponding spaces within the stationary bracket (24) to add strength to the clip-on attachment (20) and prevent unnecessary relative movement or bending outside of the linear axis of motion along the bracket sliders (34). Both the sliding bracket (22) and the stationary bracket (24) are connected to rotatable clip-on clamp ends (30) by clip-on clamp hinge pins (32) allowing the clamp ends (30) to fold out perpendicularly to the clip-on brackets (22, 24) when the cell phone (10) is attached, and parallel to the clip-on brackets (22, 24) when the cell phone (10) is not attached, allowing the clamp ends (30) to take up less space. These features allow the clip-on attachment (20) to be adjusted to variable widths, in order to accommodate different designs of personal cell phones.

In addition to the embodiments described above, further embodiments are also contemplated. In the embodiment shown in FIG. 5 and FIG. 6, the clip-on attachment screw (28) and the stand arm screw (48) utilize hexagonal bolt heads fitted into corresponding recesses in the lower and upper stand arms (50,52) to prevent the clip-on attachment screw (28) and the stand arm screw (48) from loosening with repeated use. To accommodate the assembly of the embodiment, the clip-on stationary bracket (24) portion of the clip-on attachment (20) includes the addition of an additional secondary clip-on attachment screw (60), an additional secondary clip-on attachment nut (62) and the separation of the clip-on attachment stand-off (64) from the clip-on stationary bracket (24) into two pieces. In this embodiment, the folding stand assembly (40) can be assembled with the clip-on attachment screw (28) and the stand arm screw (48) nested into the corresponding recessed spaces within the lower and upper stand arms (50,52) and then attached by rotation of the folding stand assembly (40) and the clip-on attachment stand-off (64) to the clip-on attachment (20). The clip-on attachment stand-off (64) can then be fastened into place by the secondary clip-on attachment screw (60), preventing the clip-on attachment stand-off (64) from rotation and ensuring that the clip-on attachment screw (28) will not loosen with use.

Figure 5:
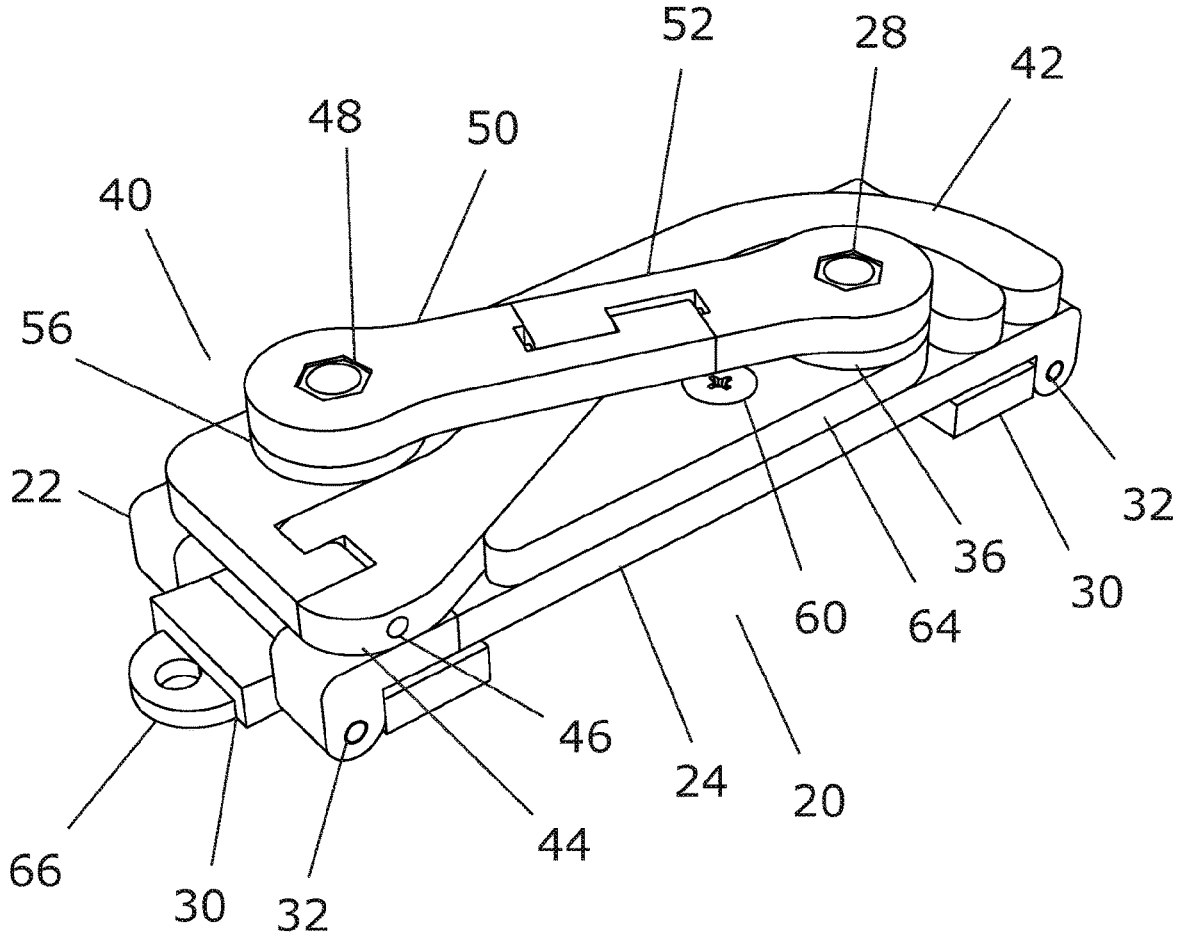
FIG. 5 is a perspective view of a foldable phone tripod, according to another embodiment, in a folded configuration.
Figure 6:
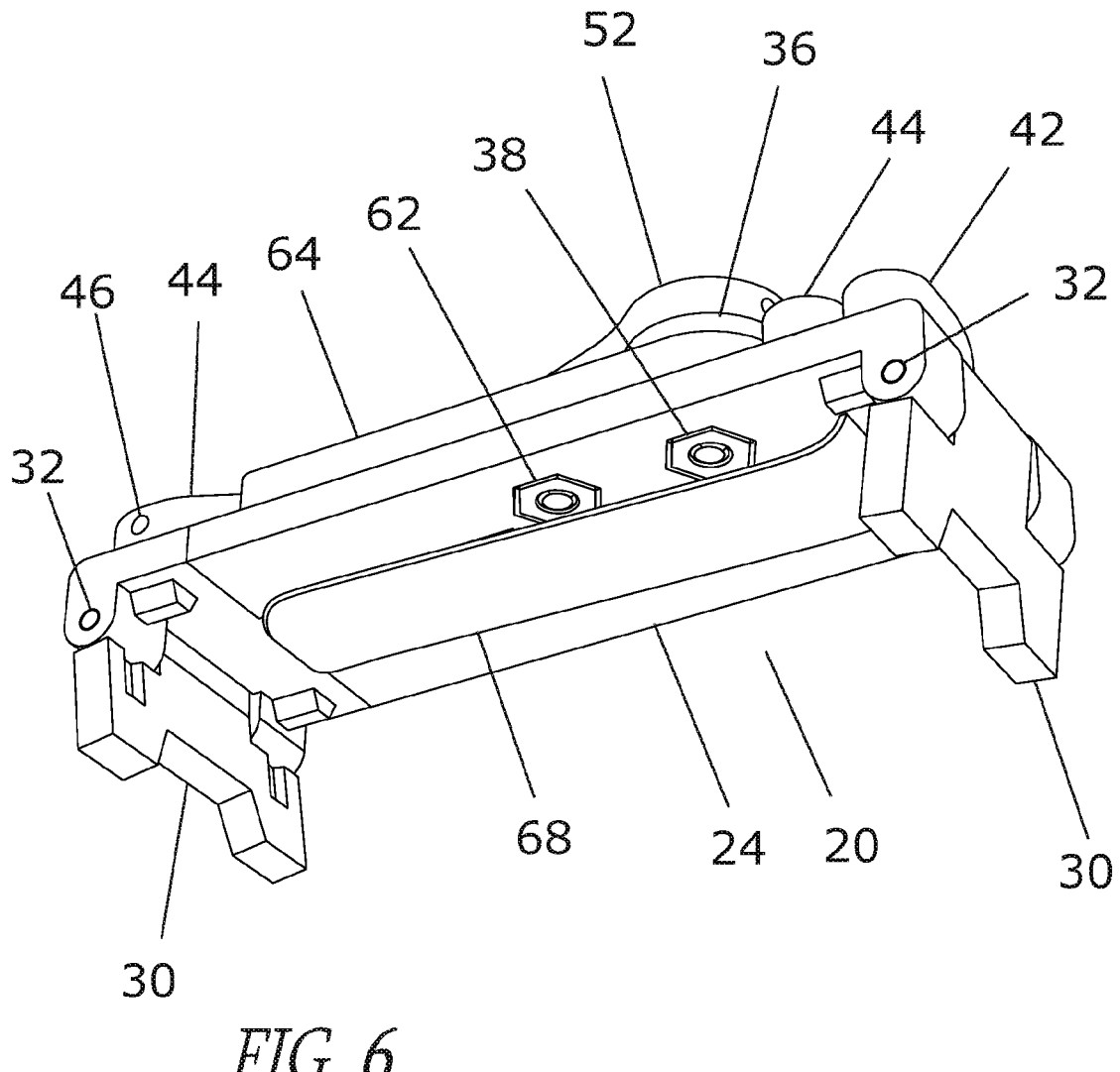
FIG. 6 is a perspective view of the foldable phone tripod of FIG. 5, from a different angle showing features not visible in FIG. 5.
Figure 7:
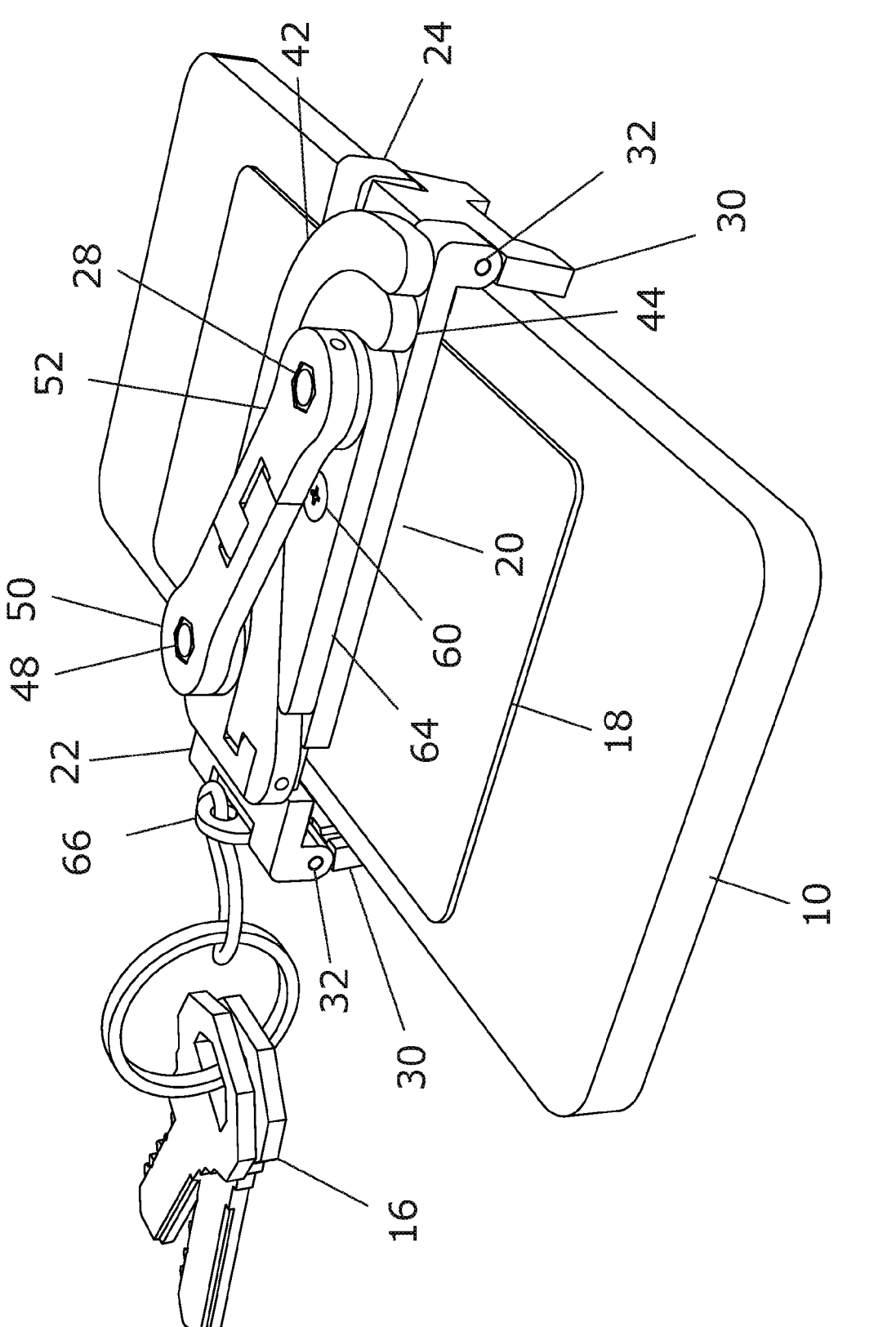
FIG. 7 is a perspective view of the foldable phone tripod of FIG. 5, showing the foldable phone tripod attached to a cell phone, a credit card, and a set of keys according to an embodiment.

Referring to the embodiment as shown in FIGS. 5 to 7, additional features are incorporated including a key chain loop (66) and a credit card or money clip (68). The key chain loop (66), according to one embodiment, may consist of a small loop of additional material as part of the clip-on clamp end (30) containing a hole to allow attachment of a key chain (16). The credit card or money clip (68), according to an embodiment, may consist of a piece of spring metal with a flat shape and a bend at one end, with that end of the credit card or money clip (68) inserted into the stationary bracket (24) portion of the clip-on attachment (20) and lying parallel to the clip-on attachment (20) while providing a spring force in the direction against the clip-on attachment stationary bracket (24) to allow for paper cash or credit cards (18) to be held securely in place in relation to the clip-on attachment (20). These features allow the user to attach a keychain (16), and/or paper cash or a credit card (18) to the clip-on attachment (20) and to their cell phone (10) in any combination desired.

Figure 8:
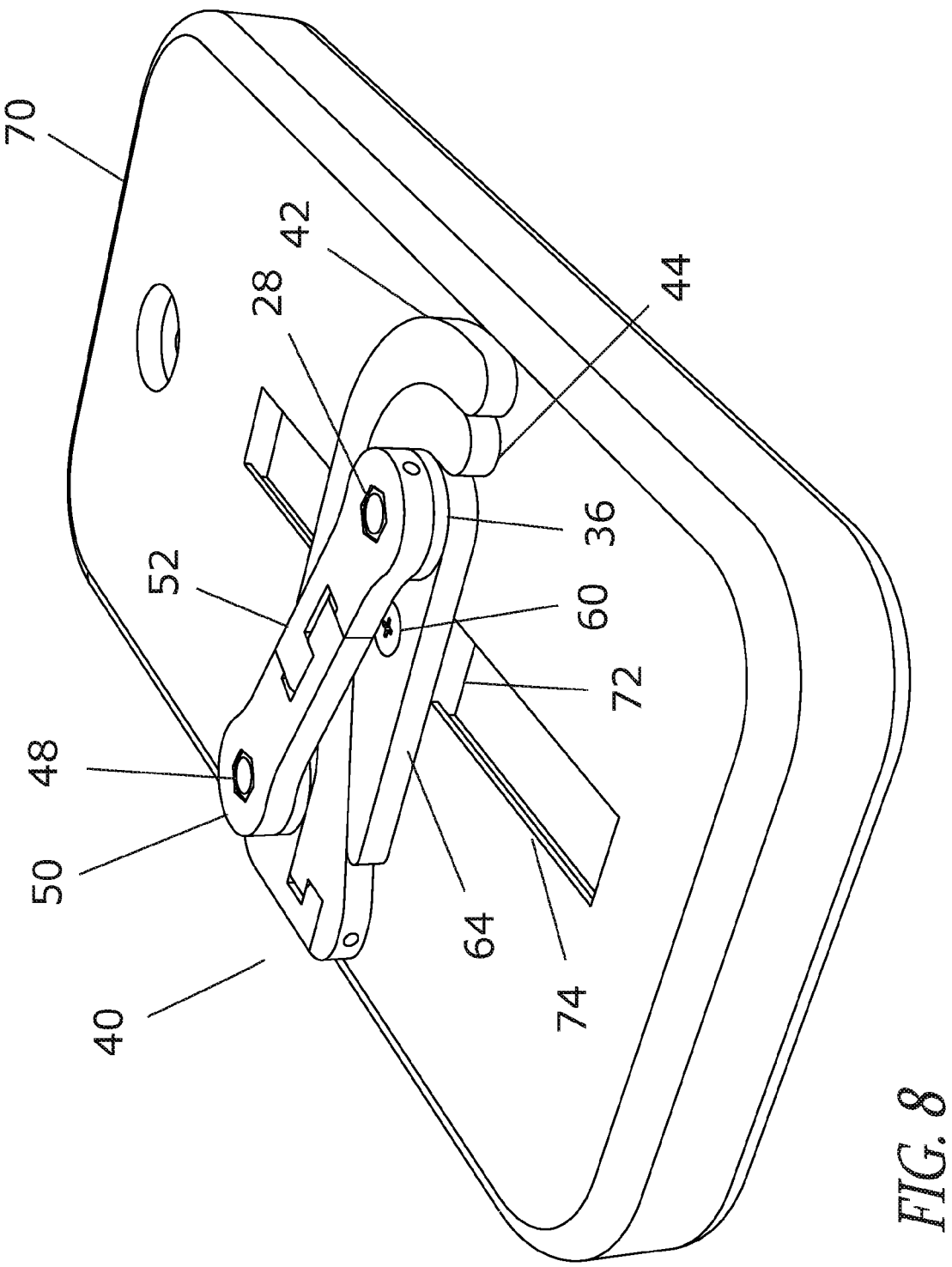
FIG. 8 is a perspective view of a foldable phone tripod, according to another embodiment, in a folded configuration attached to a cell phone case.
Figure 9:
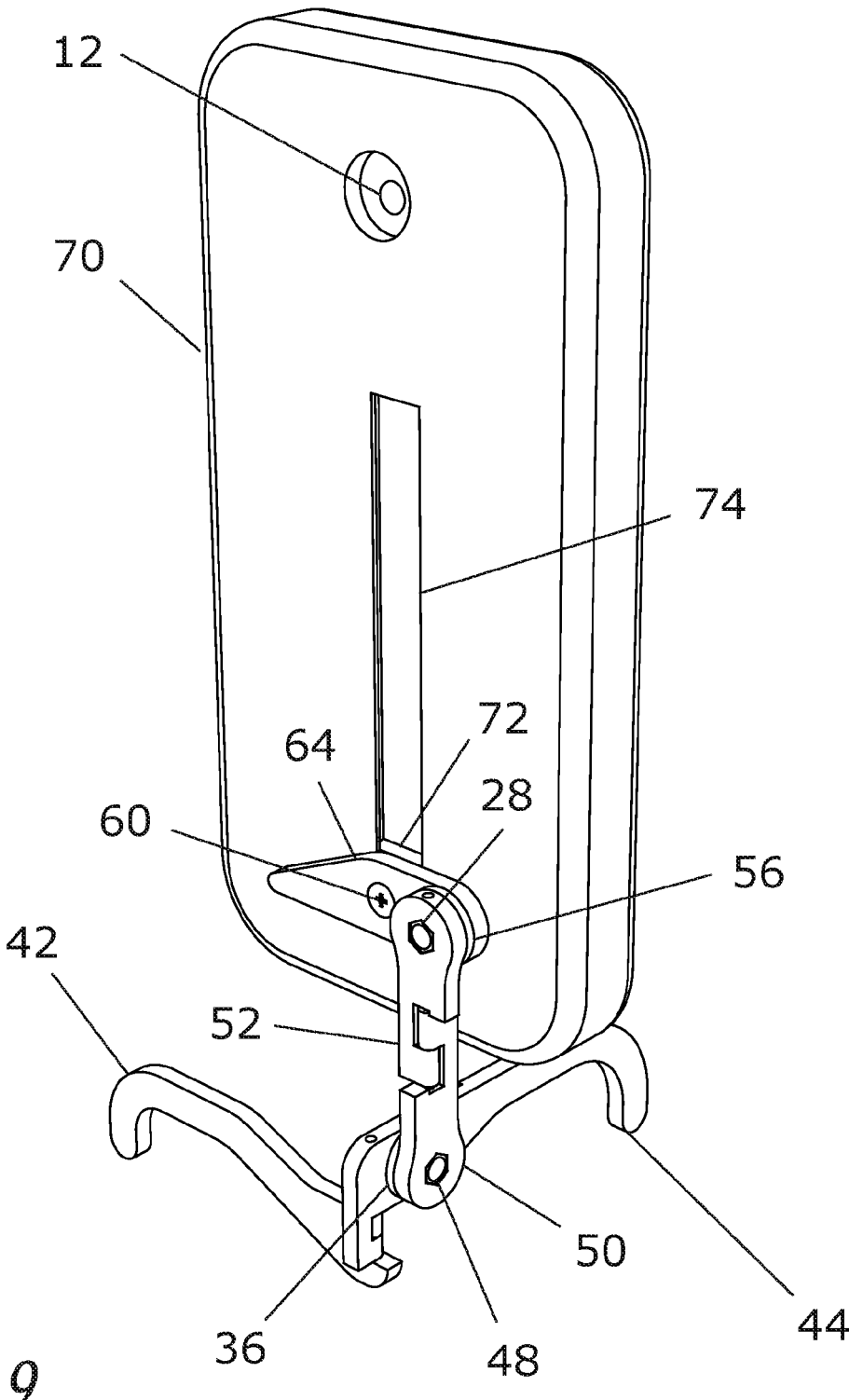
FIG. 9 is a perspective view of the foldable phone tripod of FIG. 8, with the foldable phone tripod supporting the cell phone case in the portrait orientation.

According to a further embodiment, referring to the embodiment as shown in FIGS. 8 and 9, a cell phone case (14) is provided, comprising a foldable tripod stand (30), similar to tripods shown or described in other embodiments, that is coupled to a case (14) configured to receive a cell phone (10). In one embodiment, the cell phone case (14) is connected to the foldable tripod stand (30) by a sliding connector (72) recessed within a phone case sliding connector slot (74) so that the position of the foldable tripod stand (30) relative to the length of the cell phone case (14) is variable, in order to allow the unfolded tripod stand (30) to support the cell phone case (14) in either the horizontal "landscape" position or the vertical "portrait" orientation, by the positioning of the attachment stand-off (64) near the middle or at the bottom end of the connector slot (74), respectively. An alternative embodiment may use a powerful magnet within the attachment stand-off (64) and a metallic cell phone case (14) to allow the position of the tripod stand (30) to be varied, or allow the tripod stand (30) to be attached by magnetic force and removed from a metallic cell phone case (14) by the user as desired.

Figure 10:
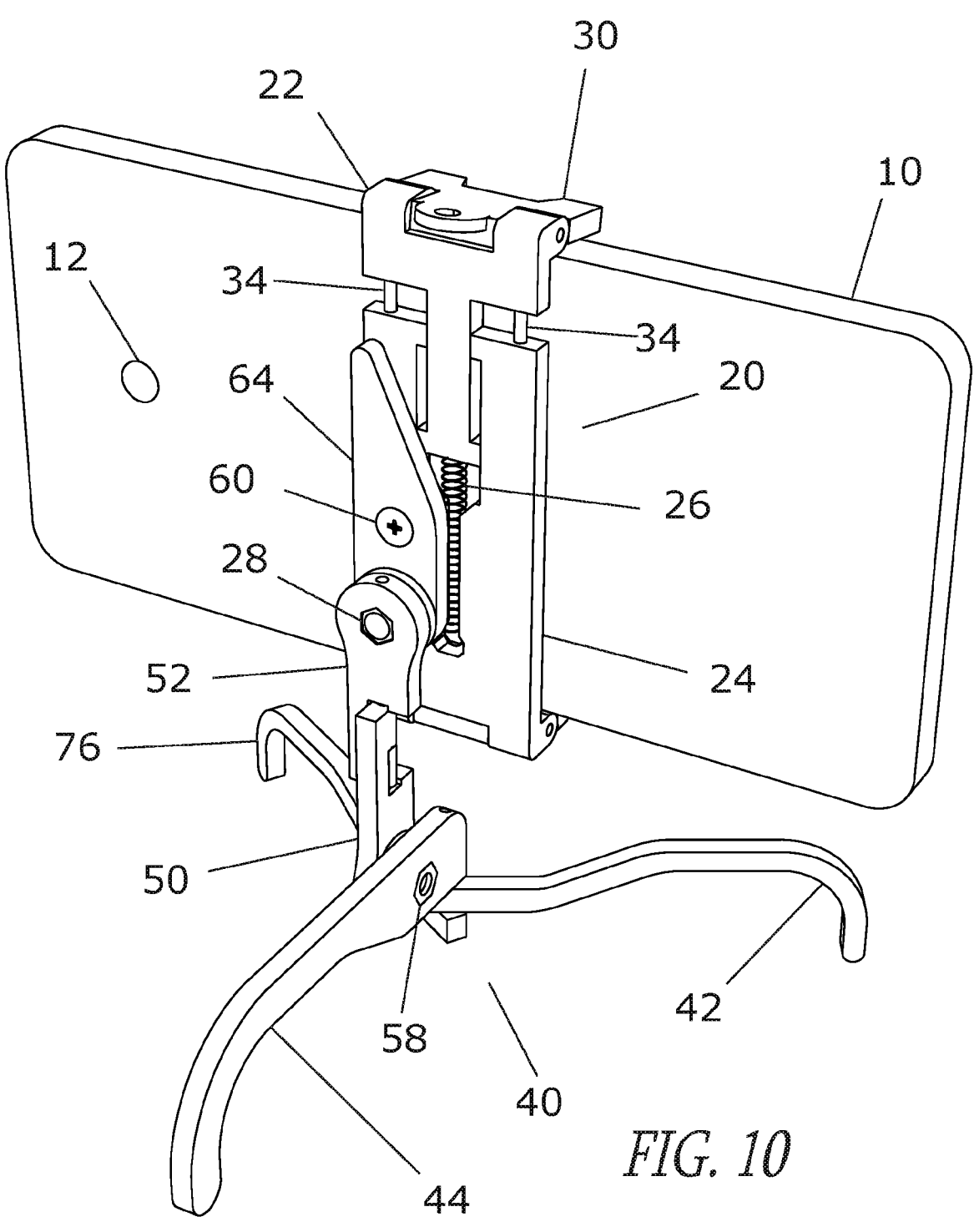
FIG. 10 is a perspective view of the foldable phone tripod, according to another embodiment, with the clip-on phone tripod attached to a cell phone, supporting it in the landscape orientation.

According to a further embodiment, referring to the embodiment as shown in FIG. 10, a third tripod stand leg (76) is added to the upper and lower tripod stand legs (42, 44), configured to rotate around the same axis as the upper and lower tripod stand legs (42, 44) described in other embodiments. In an embodiment, a first (upper) stand leg (42) second (lower) stand leg (44) and third (lowest) stand leg work as described in other embodiments, with a common axis of rotation, and with the lower stand arm (50) attached to the upper stand leg (42) by the stand arm screw (48). In an embodiment, the ends of the three stand legs (42, 44, 76) define a common plane in the unfolded configuration to support the clip-on attachment (20) or cell phone case (14) allowing the positioning of the cell phone (10) in a manner similar to other embodiments, and fold together in a compact nestled configuration similar to other embodiments. The advantage of this embodiment is the three stand legs (42, 44, 76) can be oriented to create a wider base of support for the tripod stand (40), thereby making the positioning of the cell phone (10) more stable over a wider area.

The abstract of the present disclosure is provided as a brief outline of some of the principles of the invention according to one embodiment, but is not intended as a complete or definitive description of any single embodiment thereof, nor should it be relied upon to define terms used in the specification or claims. The abstract does not limit the scope of the claims.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures that are not central to the disclosed principles have not been shown or described in detail to avoid unnecessarily obscuring descriptions of the embodiments. In general, in the claims that follow, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A cell phone camera tripod, comprising:
a first stand leg having first and second ends;
a second stand leg having first and second ends, coupled
   at the first end to the first end of the first stand leg and
   configured to rotate, relative to the first stand leg, about
   a first axis of rotation, the first and second stand legs being configured to rotate into a stowed configuration in which the first and second stand legs lie in a same layer of components; and a stand arm having first and second ends, coupled at the first end to the first stand leg at a point near the first end of the first stand leg and configured to rotate, relative to the first stand leg, about a second axis of rotation, perpendicular to the first axis of rotation, and to rotate into stowed configuration in which the stand arm lies in a second layer of components;

wherein contact points at the second end of the first stand leg and at the first and second ends of the second stand leg lie in a common plane, the first axis lying normal to the common plane; and while the first and second stand legs are in the stowed configuration, the first, second, and third contact points lie on a common line.

2. The tripod of claim 1, further comprising a clip-on attachment coupled to the second end of the stand arm and rotatable, relative to the stand arm, about a third axis of rotation, the third axis of rotation lying perpendicular to a longitudinal axis of the stand arm, the clip-on attachment having a pair of gripping jaws configured to grip and hold a cell phone in a user-selected orientation.

3. The tripod of claim 1, further comprising a third stand leg having first and second legs, coupled at the first end to the first end of the first stand leg and configured to rotate, relative to the first stand leg, about the first axis of rotation about which the first end of the second stand leg also rotates relative to the first stand leg.

4. A cell phone camera tripod comprising:

a first stand leg having first and second ends;

a second stand leg having first and second ends, coupled at the first end to the first end of the first stand leg and configured to rotate, relative to the first stand leg, about a first axis of rotation, the first and second stand legs being configured to rotate into a stowed configuration in which the first and second stand legs lie in a same layer of components; and a stand arm having first and second ends, coupled at the first end to the first stand leg at a point near the first end of the first stand leg and configured to rotate, relative to the first stand leg, about a second axis of rotation, perpendicular to the first axis of rotation, and to rotate into stowed configuration in which the stand arm lies in a second layer of components;

wherein the stand arm includes first and second segments configured to rotate, relative to each other, about a third axis, perpendicular to the second axis, the first segment being coupled to the first stand leg.

5. The tripod of claim 4, further comprising a cell phone holding element, coupled to the second segment of the stand arm and configured to rotate, relative to the third axis, about a fourth axis, perpendicular to the third axis.

6. The tripod of claim 5, wherein the cell phone holding element is a clip-on attachment, configured to engage a cell phone between spring-driven jaws and hold the cell phone in a user-selected orientation.

7. The tripod of claim 5, wherein the cell phone holding element is a cell phone case.

8. The tripod of claim 4, further comprising a clip-on attachment coupled to the second end of the stand arm and rotatable, relative to the stand arm, about a third axis of rotation, the third axis of rotation lying perpendicular to a longitudinal axis of the stand arm, the clip-on attachment having a pair of gripping jaws configured to grip and hold a cell phone in a user-selected orientation.

* * * * *